United States Patent Office 3,748,175
Patented July 24, 1973

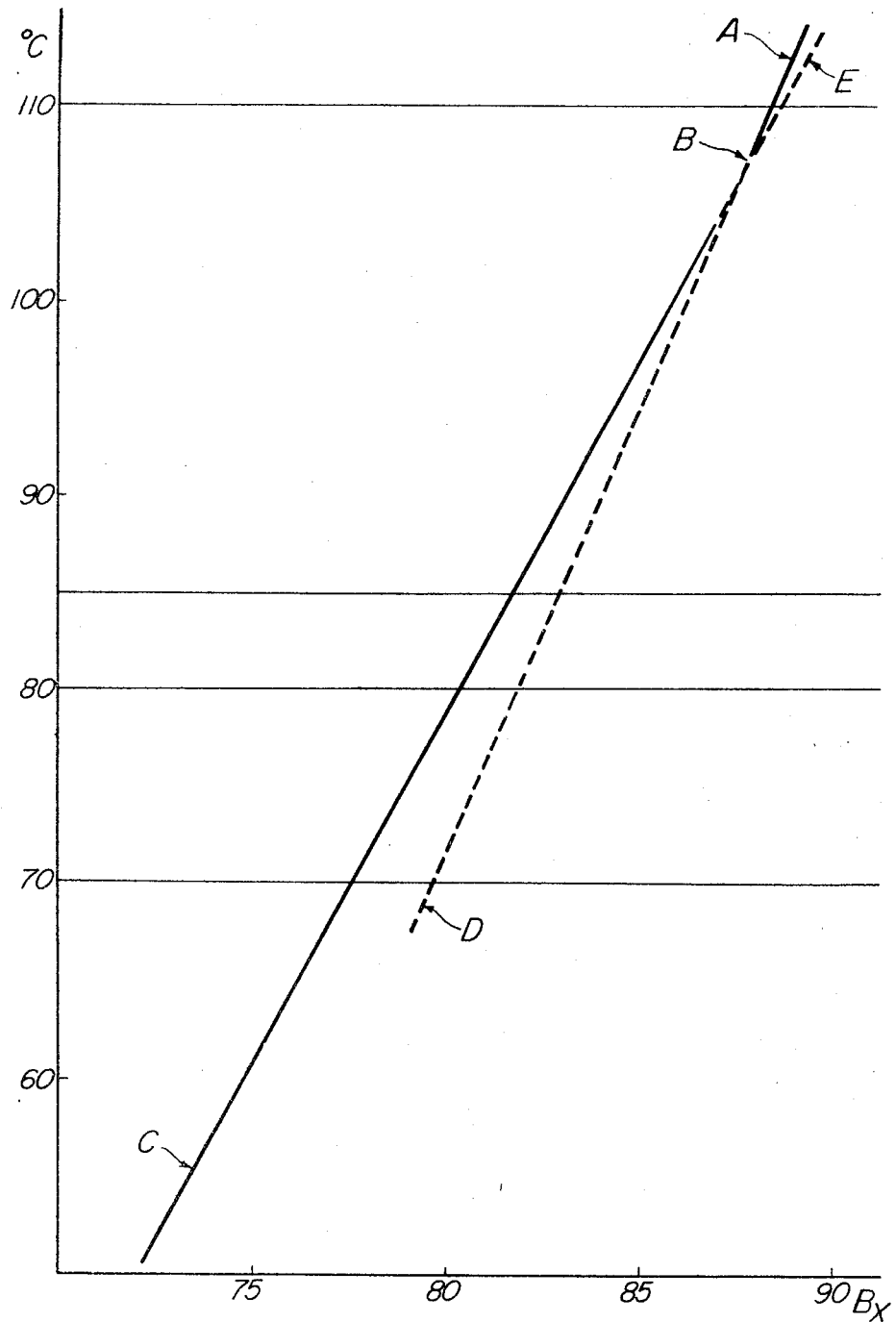

3,748,175
PROCESS FOR PREPARING CRYSTALLINE, ANHYDROUS BETA-DEXTROSE
Tamotsu Kawamura, Tokyo, Kazuo Yamashita, Yokkaichi, and Keisuke Hattori and Yoshinao Ito, Mie, Japan, assignors to Tokai Togyo Co., Ltd., Yokkaichi-shi, Mieken, Japan
Continuation of abandoned application Ser. No. 811,426, Mar. 28, 1969. This application July 6, 1971, Ser. No. 160,122
Claims priority, application Japan, Apr. 6, 1969, 44/22,378
Int. Cl. C13k 1/10
U.S. Cl. 127—60    2 Claims

ABSTRACT OF THE DISCLOSURE

Crystalline, anhydrous beta-dextrose is prepared by concentrating an aqueous solution containing dextrose under under a reduced pressure to a concentration of Brix 88° to 91°, seeding the concentrated solution with crystalline, anhydrous beta-dextrose as seed crystals at a seeding temperature ranging 85° to 110° C. according to a shock seeding method or 80° to 110° C. according to a full seeding method, and subsequently boiling the resulting massecuite at a massecuite temperature ranging from 70° to 110° C. Likewise, a mixture of crystalline, anhydrous beta-dextrose and crystalline, anhydrous alpha-dextrose at a desired mixing ratio is prepared by concentrating an aqueous solution containing dextrose to a concentration of Brix 88° to 91° under a reduced pressure, seeding the concentrated solution with a mixture of crystalline, anhydrous beta- and alpha-dextroses at a desired mixing ratio as seed crystals at a seeding temperature ranging from 85° to 110° C. and subsequently boiling the resulting massecuite at a massecuite temperature of 85° to 110° C.

---

The massecuite has a good purgeability in a centrifuge and the product dextrose has a good lustre, high dextrose equivalent, uniform grain sizes and less hygroscopicity.

This is a streamlined continuation application of Ser. No. 811,426, filed Mar. 28, 1969, and now abandoned in favor of the present case.

This invention relates to a process for preparing a high purity crystalline, anhydrous beta-dextrose or a mixture of crystalline, anhydrous beta- and alpha-dextroses from an aqueous solution of dextrose such as an aqueous solution of redissolved dextrose aqueous solution or starch hydrolyzate.

In the medical field, chemical industry and carbonated beverage industry, a high purity, crystalline dextrose having a low water content is in a great demand, and crystalline anhydrous alpha-dextrose has been heretofore used to satisfy such demand. However, the crystalline, anhydrous alpha-dextrose has the following disadvantages: the crystalline, anhydrous alpha-dextrose is relatively slowly dissolved in water. For example, when it is dissolved in water at 50° C. or less, particularly in cold water, a portion of the crystalline, anhydrous alpha-dextrose is converted to dextrose monohydrate, and the dextrose monohydrate is agglomerated and settled down toward the bottom of a dissolving tank, whereby the dissolution of the alpha-dextrose is much more retarded. Accordingly, in order to dissolve the crystalline, anhydrous alpha-dextrose as well as the dextrose monohydrate, it is necessary to use a high temperature water or add the dextrose gradually to water with sufficient stirring. Consequently, it takes relatively much time and labour to dissolve the crystalline, anhydrous alpha-dextrose.

On the other hand, the crystalline, anhydrous beta-dextrose has a high solubility in cold water, for example, about twice as high as the solubility of the alpha-dextrose in cold water. Further, the beta-dextrose has a high rate of dissolution. Furthermore, the beta-dextrose undergoes no agglomeration due to the hydrate formation as seen when the crystalline, anhydrous alpha-dextrose is dissolved in water.

It is known that the transition point of the crystalline, anhydrous alpha-dextrose to anhydrous beta-dextrose is about 108° C.; the transition point of the anhydrous alpha-dextrose to the hydrated alpha-dextrose is about 55° C.; when there are a liquid phase and a solid phase in a system in a temperature range from 55° to 108° C., the solid phase consist of anhydrous alpha-dextrose; and the anhydrous beta-dextrose starts to deposit only at a temperature of 108° C. or higher. Thus, in order to obtain the crystalline, anhydrous beta-dextrose from an aqueous solution of dextrose, it has been heretofore deemed necessary to carry out the crystallization at a temperature of at least 110° C. However, the crystallizing operation at such an elevated temperature has industrially very difficult problems due to the poor stability of the dextrose to heat, and thus it has been deemed impossible to obtain crystalline, anhydrous beta-dextrose in a commercial scale.

U.S. Pat. No. 1,693,118 discloses the conditions for preparing the anhydrous beta-dextrose in connection with the preparation of the crystalline, anhydrous alpha-dextrose, but it is found that it is impossible to prepare a high purity crystalline, anhydrous beta-dextrose under such conditions.

As a result of extensive studies and researchers of a process for preparing a high purity crystalline, anhydrous beta-dextrose in a commercial scale, the present inventors have found a novel process for preparing the same from an aqueous solution of dextrose such as an aqueous solution of redissolved dextrose or starch hydrolyzate. That is to say, as a result of studies on relations between the massecuite temperature, and seeding, growth and development of the beta-dextrose crystals based on an imaginary saturation curve of crystalline, anhydrous beta-dextrose extended below the transition point of 108° C., as shown in the accompanying drawing, the present inventors have found the conditions necessary for preparing crystalline, anhydrous beta-dextrose or a mixture of crystalline, anhydrous beta- and alpha-dextrose crystals at a desired mixing ratio below said transition point of 108° C. In other words, the present inventors have found a specific temperature range for obtaining the beta-dextrose crystals or a mixture of the beta- and alpha-crystals in a better purgeable state from the massecuite containing the same without any thermal deterioration. It is found that that the specific temperature range can be divided into three ranges: (1) stable seeding and boiling range (85°–110° C.), (2) meta-stable boiling range (80°–85° C.), and unstable crystallization range (70°–80° C.).

Explanation is made hereunder with reference to the accompanying drawing.

The accompanying drawing is a graph showing saturation curves of anhydrous alpha-dextrose crystals and anhydrous beta-dextrose crystals and imaginary saturation curves of anhydrous beta-dextrose crystals below the transition point and alpha-dextrose crystals above the transition point. That is, the curve A–B is the saturation curve of anhydrous beta-dextrose crystals; curve B–C that of anhydrous alpha-dextrose crystals; dotted curve B–D the imaginary saturation curve of anhydrous beta-dextrose crystals below the transition point; and dotted curve B–E that of anhydrous alpha-dextrose crystals above the transition point. The axis of abscissa represents the concentration of the aqueous solution of dextrose in Brix degree and the axis of ordinate the temperature of the solution in ° C.

(1) Stable seeding and boiling range (85°–110° C.)

In this range, a distance between the saturation curve of alpha-dextrose and the imaginary saturation curve of beta-dextrose is small as shown in the drawing, that is, the difference between the degree of supersaturation of alpha-dextrose and that of beta-dextrose is small, and thus when the supersaturated aqueous solution of dextrose is seeded with seed crystals consisting only of crystalline, anhydrous beta-dextrose, a massecuite containing only crystalline, anhydrous beta-dextrose can be obtained. The formed false grains are all comprised of beta-dextrose, and thus the seeding can be conducted according to a full seeding method, where a large amount of seed crystals are added to the supersaturated solution to develop the added seed crystals or a shock seeding method, where a relatively small amount of seed crystals are added to the solution to form the necessary amount of crystals by shocking and develop the shock-formed crystals. However, in seeding the saturated solution below 85° C., the false grains of anhydrous alpha-dextrose tend to be formed, because the difference between the degree of supersaturation of alpha-dextrose and that of beta-dextrose becomes somewhat larger. Thus, the shock seeding method cannot be carried out below 85° C.

When the supersaturated aqueous solution of dextrose is seeded with a mixture of crystalline, anhydrous beta- and alpha-dextrose at a desired mixing ratio as seed crystals, a massecuite containing anhydrous beta- and alpha-dextroses formed at the desired mixing ratio can be obtained. The formed false grains are comprised of beta- and alpha-dextroses at the desired mixing ratio, and thus the seeding can be carried out according to the shock seeding method or full seeding method to prepare a mixture of crystalline, anhydrous beta- and alpha-dextroses, because the difference between the degree of supersaturation of alpha-dextrose and that of beta-dextrose is relatively small. However, as the difference between the degree of supersaturation of alpha-dextrose and that of beta-dextrose becomes somewhat larger below 85° C., it is impossible to obtain a mixture of anhydrous beta- and alpha-crystals at a desired mixing ratio by seeding and boiling below 85° C.

(2) Meta-stable boiling range (80°–85° C.)

In this range, a distance between the saturation curve of anhydrous alpha-dextrose and the imaginary saturation curve of beta-dextrose is larger than that of the stable seeding and boiling range (85°–110° C.), that is, the difference between the degree of supersaturation of alpha-dextrose and that of beta-dextrose becomes larger than that of the stable seeding and boiling range, and thus there is a possibility of forming false grains of anhydrous alpha-dextrose when the supersaturated aqueous solution of dextrose is seeded in this range only with crystalline, anhydrous beta-dextrose as seed crystals according to the shock seeding method. Accordingly, the seeding must be conducted in this range only according to the full seeding method. Further, to avoid shocking at the seeding it is preferable to keep the degree of supersaturation of dextrose at a little low value, for example, 1.05 to 1.20.

Once the false grains of alpha-dextrose are formed in this range, it is hard to make the formed false grains disappear by adding a dilute aqueous solution of dextrose or water to the massecuite, because the degree of supersaturation of anhydrous beta-dextrose is lowered by such dilution, whereas the degree of supersaturation of alpha-dextrose is not so much lowered thereby.

When the supersaturated solution of dextrose is seeded with a mixture of alpha- and beta-dextrose as seed crystals in this range, the growth of alpha-dextrose crystals proceeds in preferenec to the growth of beta-dextrose crystals, because the degree of supersaturation of alpha-dextrose is always higher than that of beta-dextrose in this range, as explained above. Accordingly, it is impossible to obtain a mixture of anhydrous beta- and alpha-dextrose crystals at a desired mixing ratio in this range.

(3) Unstable crystalliaztion range (70°–80° C.)

In this range, it is possible to conduct boiling and crystallization of a massecuite only in the case that the crystals in the massecuite are comprised of crystalline, anhydrous beta-dextrose, to obtain crystalline, anhydrous beta-dextrose. However, when the degree of supersaturation of dextrose is higher, the false grains of alpha-dextrose tend to be formed. Thus, it is preferable to conduct the boiling and crystallization at a little lower degree of supersaturation, for example, 1.05 to 1.20. It seems that the possible crystallization zone for anhydrous beta-dextrose is located only close to the imaginary saturation curve of beta-dextrose, that is, at a lower degree of supersaturation, and thus the false grains of alpha-dextrose tend to be formed with increased degree of supersaturation.

An object of the present invention is to provide a process for preparing crystalline, anhydrous beta-dextrose, which comprises concentrating an aqueous solution containing dextrose under a reduced pressure to a concentration of Brix 88° to 91°, seeding the concentrated solution with crystalline, anhydrous beta-dextrose as seed crystals at a seeding temperature ranging from 85° to 110° C. according to a shock seeding method, or at a seeding temperature ranging from 80° to 110° C. according to a full seeding method, and boiling the resulting massecuite at a massecuite temperature ranging from 70° to 110° C.

Another object of the present invention is to provide a process for preparing a mixture of crystalline, anhydrous beta- and alpha-dextrose at a desired mixing ratio, which comprises concentrating an aqueous solution containing dextrose under a reduced pressure to a concentration of Brix 88° to 91°, seeding the concentrated solution with a mixture of crystalline, anhydrous beta- and alpha-dextrose at a desired mixing ratio as seed crystals at a seeding temperature ranging from 85° to 110° C. according to a shock seeding method or a full seeding method, and boiling the resulting massecuite at a massecuite temperature ranging 85° to 110° C.

In preparing crystalline, anhydrous beta-dextrose according to the present invention, an aqueous solution of dextrose is concentrated in a vacuum evaporator to a concentration of Brix 88° to 91°, and then seed crystals consisting only of crystalline, anhydrous beta-dextrose are added to the concentrated solution. The temperature of the solution at seeding must be 80° to 110° C. when the seeding is carried out according to the full seeding method, 85° to 110° C. when the seeding is carried out according to the shock seeding. When the seeding is completed, the growth of crystals is effected by boiling the resulting massecuite at a massecuite temperature ranging from 70° to 110° C., preferably from 70° C. to the seeding temperature, more preferably a temperature near 70° C. and the grown crystals are subjected to separation by means of a centrifuge, whereby high purity crystalline, anhydrous beta-dextrose can be obtained. In boiling, it is preferable to make lower the degree of supersaturation than that at the seeding, to make only the crystals already present in the massecuite grow. When the massecuite is boiled below 70° C. the false grain of anhydrous alpha-dextrose are formed.

Boiling operation takes most of the time required for preparation. Further, it is preferable to conduct the boiling at a temperature near 70° C. to obtain chunky, rigid beta-dextrose crystals and improve the purgeability of massecuite. On the other hand, when the boiling temperature becomes higher, the needle-like beta-dextrose crystals which make the massecuite less purgeable and consequently make lower the purity of the product beta-dextrose, tend to be formed.

In preparing a mixture of crystalline anhydrous beta- and alpha-dextroses at a desired mixing ratio according to the present invention, an aqueous solution of dextrose is concentrated in a vacuum evaporator to a concentration of Brix 88° to 91° and then is seeded with seed crystals consisting of anhydrous beta- and alpha-dextroses at the desired mixing ratio at a seeding temperature ranging from 85° to 110° C. according to the shock seeding or full seeding method and the resulting massecuite is subjected to boiling at a massecuite temperature of 85° to 110° C., preferably 85° C. to the seeding temperature, more preferably a temperature near 85° C. When the boiling is conducted below 85° C., growth of anhydrous alpha-crystals proceeds in preference to that of anhydrous beta-crystals, the product cannot be obtained at the desired mixing ratio, and the purgeability of the massecuite becomes worse and as a result the dextrose equivalent of the product is lowered.

The present invention is summarized as follows.

(I) Production of high purity crystalline, anhydrous dextrose:

(i) Concentration of aqueous solution of dextrose at the seeding must be Brix 88° to 91°.
(ii) Seeding temperature must be 80° to 110° C. according to the full seeding method or 85° to 110° C. according to the shock seeding temperature.
(iii) Seed crystals must be comprised of anhydrous beta-dextrose crystals.
(iv) Boiling must be conducted at 70° to 110° C., preferably 70° C. to the seeding temperature, more preferably a temperature near 70° C.

(II) Production of a mixture of crystalline, anhydrous beta- and alpha-dextrose at a desired mixing ratio:

(i) Concentration of aqueous solution of dextrose at the seeding must be Brix 88° to 91°.
(ii) Seeding temperature must be 85° to 110° C.
(iii) Seed crystals must be comprised of a mixture of anhydrous beta- and alpha-dextrose crystals at the desired mixing ratio.
(iv) Boiling must be conducted at 85° to 110° C., preferably 85° C. to the seeding temperature, more preferably a temperature near 85° C.

The product prepared according to the present invention has the following features.

(I) Crystalline, anhydrous beta-dextrose:

(i) A very high purity (dextrose equivalent: 99.5 to 100%).
(ii) Very good purgeability of massecuite in a centrifuge.
(iii) Very low water content (0 to 0.5%).
(iv) Very readily soluble in water without any agglomeration when dissolved, i.e. almost instantaneously soluble in water at 10° C., resulting in an aqueous solution of Brix 60° to 69°.
(v) Lustrous granules with uniform grain sizes.
(vi) Less hygroscopic and less susceptible to caking or conversion of beta- to alpha-dextrose during storage.

(II) A mixture of crystalline, anhydrous beta- and alpha-dextrose:

(i) Very good purgeability of massecuite in a centrifuge.
(ii) Mixing ration of beta- to alpha-dextrose in the final product is changeable at option.
(iii) Very low water content (0 to 0.5%).
(iv) Very high purity (dextrose equivalent: 99.5 to 100%).
(v) Lustrous granules.
(vi) No agglomeration takes place when the product is dissolved even in cold water so far as the mixing ratio of alpha-dextrose to beta-dextrose is less than 50%.
(vii) Less hygroscopic and less susceptible to caking or conversion of beta- to alpha-dextrose during storage.

Embodiments of the present invention are explained hereunder with reference to examples, but the present invention is not limited thereto.

EXAMPLE 1

An aqueous solution of dextrose (dextrose equivalent: 99%) having a concentration of Brix 50° was concentrated in a vacuum evaporator having a capacity of 25 m.$^3$, and when the concentration of the solution reached approximately Brix 80°, the absolute inside pressure of the evaporator was adjusted to about 180 mm. Hg. Concentrating operation was further continued, and when the concentration of the solution reached about Brix 89° and the temperature 90° C., about 5 kg. of seed crystals consisting of pulverized crystalline, anhydrous beta-dextrose were added to the concentrated solution. The volume of the solution inside the evaporator was about 9 m.$^3$ at the seeding.

After 30 minutes from the seeding, an aqueous solution of dextrose was added to the seeded solution to keep the degree of supersaturation at a little lower value (1.05 to 1.20) and the boiling temperature was adjusted to about 75° C. by reducing the absolute pressure of the evaporator. The boiling was continued under that condition, and when the crystals grew sufficiently in the massecuite, the massecuite was discharged into a centrifuge preheated at about 75° C., wherein the grown crystals were separated from mother liquor. The separated crystals were washed with a small amount of hot water, and the washed crystals were dried in a drier, whereby crystalline, anhydrous beta-dextrose was obtained as a product. The total boiling time was about 5 hours, and the product beta-dextrose yield was about 55% on the basis of the weight of total solid matters. The thus obtained beta-dextrose had 99.9% of dextrose equivalent and 0.08% of water content and was lustrous granules having uniform grain sizes.

EXAMPLE 2

An aqueous solution of a starch hydrolyzate (dextrose equivalent: 95.0 to 97%) having a concentration of about Brix 50° was concentrated in a vacuum evaporator having a capacity of 25 m.$^3$ in the same manner as in Example 1, and then about 2 kg. of seed crystals consisting of pulverized crystalline, anhydrous beta-dextrose were seeded to the concentrated solution having a concentration of about Brix 91° at a temperature of 90° C. The liquid volume in the evaporator at the seeding was about 9 m.$^3$.

After 30 minutes from the seeding, the boiling temperature was reduced to about 80° C. in the same manner as in Example 1, and the boiling was further continued, while keeping the degree of supersaturation constant. After about 8 hours of boiling at about 80° C., the crystals grew considerably in the massecuite and then the massecuite was transferred to a crystallizer preheated at 80° C., wherein the crystallization was conducted by gradually lowering the temperature down to 78° C., while keeping the degree of supersaturation constant (1.05 to 1.20). When the massecuite temperature reached 78° C., the massecuite was discharged into a centrifuge, wherein the grown crystals were separated from mother liquor while keeping the temperature at 78° C. The separated crystals were washed with a small amount of hot water, and the washed crystals were dried in a drier, whereby crystalline, anhydrous beta-dextrose was obtained as a product. The required total boiling and crystallizing time was about 12 hours, and the product yield was about 52% on the basis of the weight of total solid matters. The thus obtained product had a 99.7% of dextrose equivalent and 0.10% of water content, and was of uniform grain size.

EXAMPLE 3

An aqueous solution of starch hydrolyzate (dextrose equivalent: about 97%) having a concentration of about Brix 50° was concentrated in a vacuum evaporator in the same manner as in Example 1, and about 20 kg. of a mixture of pulverized crystalline, anhydrous beta- and alpha-dextroses at a 1:1 mixing ratio by weight was seeded to the concentrated solution having a concentration of about Brix 89° at a temperature of 85° C. The liquid volume in the evaporator at the seeding was about 9 m.³.

After the seeding, boiling was conducted at 85° C. while keeping the degree of supersaturation constant, after about 8 hours, the crystals grew considerably in the massecuite, and then the massecuite temperature was adjusted to 90° C. by changing the absolute pressure of the evaporator, while keeping the degree of supersaturation constant, and transferred to a crystallizer preheated at 90° C. In the crystallizer, crystallization was carried out by gradually lowering the temperature, while keeping the degree of supersaturation constant. When the massecuite temperature reached 85° C., crystal separation and drying were carried out in the same manner as in Example 1, whereby a product was obtained.

The required boiling and crystallization time was about 10 hours, and the product yield was about 52% on the basis of the weight of total solid matters.

The thus obtained product was a mixture of crystalline, anhydrous beta- and alpha-dextroses at a 1:1 mixing ratio by weight, which have 99.7% of dextrose equivalent, 0.08% of water content, good luster and uniform grain sizes.

What is claimed is:

1. A process for preparing crystalline, anhydrous beta-dextrose, which comprises concentrating an aqueous solution containing dextrose under a reduced pressure to a concentration of 88° to 91° Brix, seeding the concentrated solution with crystalline, anhydrous beta-dextrose at a temperature ranging from 85° to 100° C. by the shock seeding method or 80° to 100° C. by the full seeding method, boiling the resulting massecuite at a temperature ranging from 70° to 100° C., and recovering the thus formed crystalline, anhydrous beta-dextrose therefrom by centrifuging.

2. A process according to claim 1, wherein the boiling of the massecuite is conducted at a temperature ranging from 70° C. to the seeding temperature.

References Cited

UNITED STATES PATENTS 1,693,118    11/1928    Newkirk _____ 127—30

OTHER REFERENCES

R. L. Whistler et al., J. Biol. Chem., 125, 557–9 (1938).

G. R. Dean et al., Adv. Carbo. Chem., 5, 135–7 (1950).

MORRIS O. WOLK, Primary Examiner

S. MARANTZ, Assistant Examiner

U.S. Cl. X.R.

127—30

UNITED STATES PATENT OFFICE
CERTIFICATE OF CORRECTION

Patent No. 3,748,175    Dated  July 24, 1973

Inventor(s) T. KAWAMURA, K. YAMASHITA, K. HATTORI and Y. ITO

It is certified that error appears in the above-identified patent and that said Letters Patent are hereby corrected as shown below:

Column 1, lines 11 and 12, should read as follows:

Claims priority, application Japan, Apr. 6, 1968,
43/22,378

Signed and sealed this 29th day of January 1974.

(SEAL)
Attest:

EDWARD M. FLETCHER, JR.          RENE D. TEGTMEYER
Attesting Officer                Acting Commissioner of Patents